(No Model.)
P. C. & I. A. CARSTENSEN.
HARROW.
No. 353,440. Patented Nov. 30, 1886.
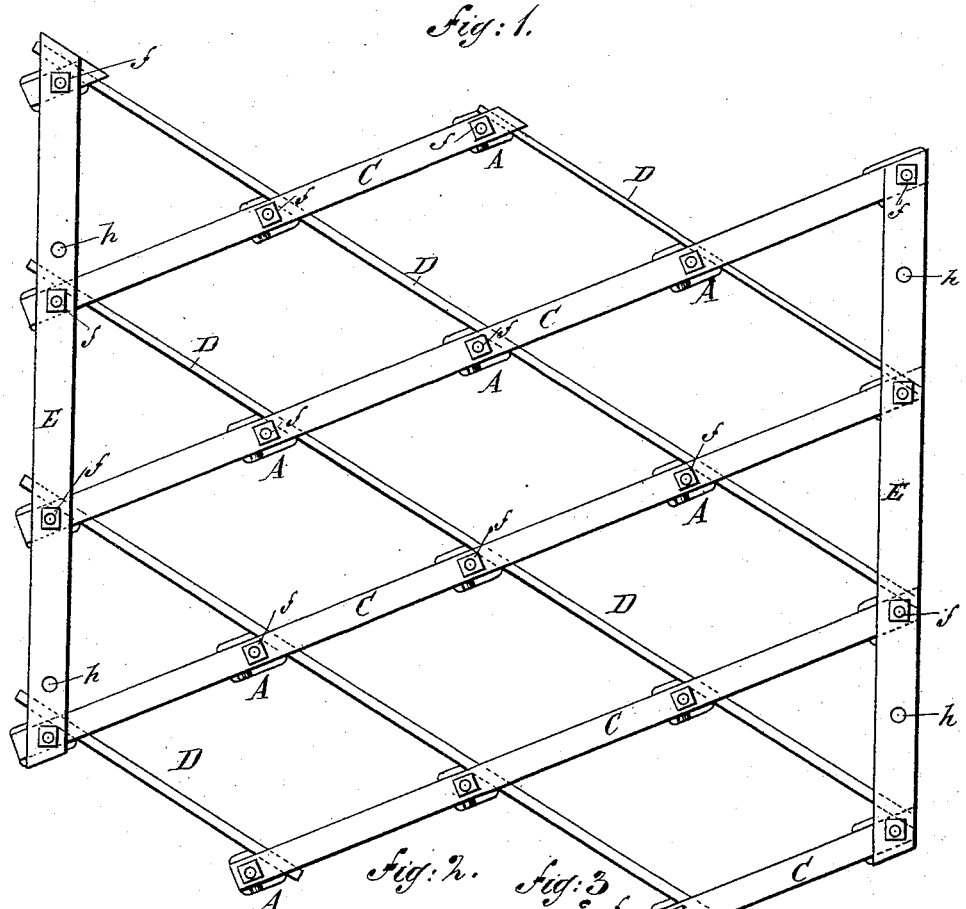
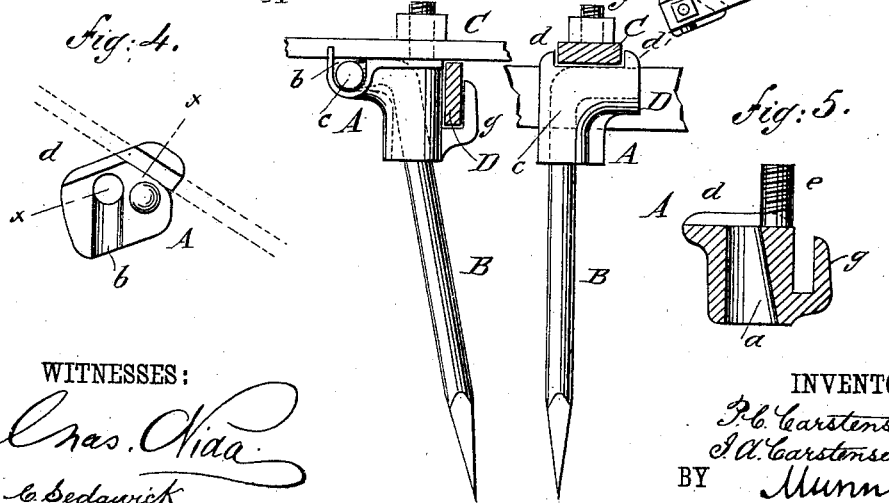
WITNESSES:
Chas. Nida
C. Sedgwick
INVENTOR:
P. C. Carstensen
I. A. Carstensen
BY Munn &
ATTORNEYS.

UNITED STATES PATENT OFFICE.

PETER C. CARSTENSEN AND INGWER A. CARSTENSEN, OF WALNUT, IOWA.

HARROW.

SPECIFICATION forming part of Letters Patent No. 353,440, dated November 30, 1886.

Application filed April 3, 1886. Serial No. 197,020. (No model.)

*To all whom it may concern:*

Be it known that we, PETER C. CARSTENSEN and INGWER A. CARSTENSEN, of Walnut, in the county of Pottawattamie and State of Iowa, have invented a new and useful Improvement in Harrows, of which the following is a specification, reference being had to the annexed drawings, forming a part thereof, in which—

Figure 1 is a plan view of one section of our improved harrow. Fig. 2 is a side elevation of one of the harrow-teeth. Fig. 3 is a front elevation. Fig. 4 is a plan view of the harrow-socket. Fig. 5 is a vertical transverse section of the harrow-socket, taken on line $xx$ in Fig. 4.

Similar letters of reference indicate corresponding parts in the different figures of the drawings.

The object of our invention is to construct a light, strong, and inexpensive harrow having a frame composed of flat bars of iron or steel, arranged diagonally in two series crossing each other, the bars of one series being arranged flatwise, and the bars of the other series edgewise, the bars being connected with each other and with the harrow-tooth by a socket adapted to be received on the two series of bars at their intersection.

The socket A, for holding the harrow-teeth and connecting the two series of bars, consists of a casting having a central vertical aperture, $a$, with a lateral recess, $b$, for receiving the right-angled end $c$ of the harrow-tooth B. The lower part of the hole in the socket in which the harrow-tooth is received is flared or widened, as shown in Fig. 5, to permit of a small amount of lateral movement of the harrow-tooth, the tooth turning on its right-angled arm as a pivot. Upon opposite edges of the surface of the socket A are formed ribs $d$ $d'$, between which is received the flat diagonal bar C, forming one of the series of bars of which the body of the harrow is made. Between the ribs $d$ $d'$ a stud, $e$, projects upward from the face of the socket for receiving the apertured bar C and the nut $f$, by which the bar is clamped to the socket. Upon the side of the socket, about opposite the recess $b$, is formed a hook, $g$, for receiving the flat bar D, which is clamped in the hook $g$ by the bar C. One socket is placed at each intersection of the bars C D, the nuts $f$ clamping the bars securely to each other and to the socket, and holding the harrow-tooth B in position for use.

In addition to the diagonal bars C D the studs of the end rows of sockets receive the apertured bars E, which are clamped upon the bars C by the nuts $f$. One of the bars E of the harrow is connected by links or clevises secured in the bolt-holes $h$, formed in the bars, with the evener by which the harrow is drawn forward. It will thus be seen that by means of a single socket at each intersection of the bars the bars are strongly clamped together, and the harrow-teeth B are securely held in proper relation to the bars.

By arranging the bars C flatwise and the bars D edgewise we are enabled to secure strength and rigidity without undue weight. By attaching the sockets to the frame of a harrow by means of a single threaded stud and nut any harrow-tooth may be readily removed and replaced without disturbing the other teeth.

Having thus described our invention, what we claim as new, and desire to secure by Letters Patent, is—

1. As an improved article of manufacture, the socket A, provided with the vertical aperture $a$, the lateral recess $b$, the stud $e$, and the hook $g$, as specified.

2. The combination, with the bars C D, of the socket A, provided with the flaring opening $a$ and recess $b$, communicating therewith, and having the hook $g$, threaded stud $e$, and nut $f$, adapted to the stud, substantially as herein shown and described.

3. The combination, with the bars C D, of the socket A, provided with the ribs $d$, the flaring opening $a$, and recess $b$, communicating therewith, and having the threaded stud $e$, the hook $g$, and the harrow-tooth B, having the right-angled end $c$, adapted to be received in the socket A, substantially as herein shown and described.

PETER C. CARSTENSEN.
INGWER A. CARSTENSEN.

Witnesses:
JOHN E. BLACKMORE,
JOHN B. GUIDE.